United States Patent [19]
Darlington, Jr. et al.

[11] Patent Number: 5,922,206
[45] Date of Patent: Jul. 13, 1999

[54] PROCESS FOR TREATING WATER FOR REMOVAL OF OIL AND WATER-SOLUBLE PETROLEUM OIL COMPONENTS

[75] Inventors: Jerald W. Darlington, Jr., Marengo; Steven E. Yuchs, Bolingbrook, both of Ill.

[73] Assignee: AMCOL International Corporation, Arlington Heights, Ill.

[21] Appl. No.: 08/931,027

[22] Filed: Sep. 15, 1997

[51] Int. Cl.⁶ .................................................. C02F 1/28
[52] U.S. Cl. ......................... 210/693; 210/694; 210/908
[58] Field of Search ................................. 210/693, 691, 210/692, 694, 908

[56] References Cited

U.S. PATENT DOCUMENTS

| | | | |
|---|---|---|---|
| 2,531,427 | 11/1950 | Hauser | 260/448 |
| 2,623,013 | 12/1952 | D'Alelio | 210/24 |
| 3,046,233 | 7/1962 | Levy | 252/193 |
| 4,297,220 | 10/1981 | Meitzner et al. | 210/690 |
| 4,359,593 | 11/1982 | Feldman | 568/916 |
| 4,415,467 | 11/1983 | Piepho | 252/181 |
| 4,517,094 | 5/1985 | Beall | 210/664 |
| 4,640,831 | 2/1987 | DeVries | 423/481 |
| 4,717,699 | 1/1988 | Mickelson | 502/83 |
| 5,104,545 | 4/1992 | Means et al. | 210/650 |
| 5,135,656 | 8/1992 | Means et al. | 210/650 |
| 5,135,676 | 8/1992 | Buchwald et al. | 252/171 |
| 5,266,208 | 11/1993 | Stahly et al. | 210/669 |
| 5,330,946 | 7/1994 | Hynes et al. | 502/82 |
| 5,567,318 | 10/1996 | Beall | 210/691 |
| 5,604,264 | 2/1997 | McQuigg | 521/38 |

FOREIGN PATENT DOCUMENTS

| | | |
|---|---|---|
| 1103170 | 3/1979 | Canada . |
| 0 432 787 A1 | 6/1991 | European Pat. Off. . |
| 0 787 688 A1 | 8/1997 | European Pat. Off. . |
| 1 028 267 | 4/1958 | Germany . |
| 1 032 458 | 6/1958 | Germany . |
| 1 191 141 | 5/1970 | United Kingdom . |
| 2 294 456 | 5/1996 | United Kingdom . |
| WO 94 14513 A1 | 7/1994 | WIPO . |
| WO 94 28994 A1 | 12/1994 | WIPO . |

OTHER PUBLICATIONS

*Kirk–Othmer Encyclopedia of Chemical Technology*, 4th Ed., vol. 20, pp. 641–679.

REILLEX™ Report 6, Reillex™:A New Family of Crosslinked Polyvinylpyridines from Reilly, ©1989 Reilly Industries Inc.

*Primary Examiner*—Peter A. Hruskoci
*Attorney, Agent, or Firm*—Marshall, O'Toole, Gerstein, Murray & Borun

[57] ABSTRACT

A process for treating produced water for removal of a majority of the water-insoluble petroleum oil components using an oil-adsorbent, such as an organophilic clay or an acid-activated smectite clay, such as acid-activated calcium bentonite clay, to provide a reduced-oil produced water in a first or pretreatment step; and then treating the reduced-oil produced water with a macroreticular adsorbent resin, such as styrene cross-linked with divinylbenzene, or a polyvinyl pyridine resin to remove marginally water-soluble petroleum oil components, such as $C_6+$ carboxylic acids, phenolics, naphthenic carboxylic acid compounds, and aromatic carboxylic acids, such as benzene carboxylic acids.

17 Claims, 1 Drawing Sheet

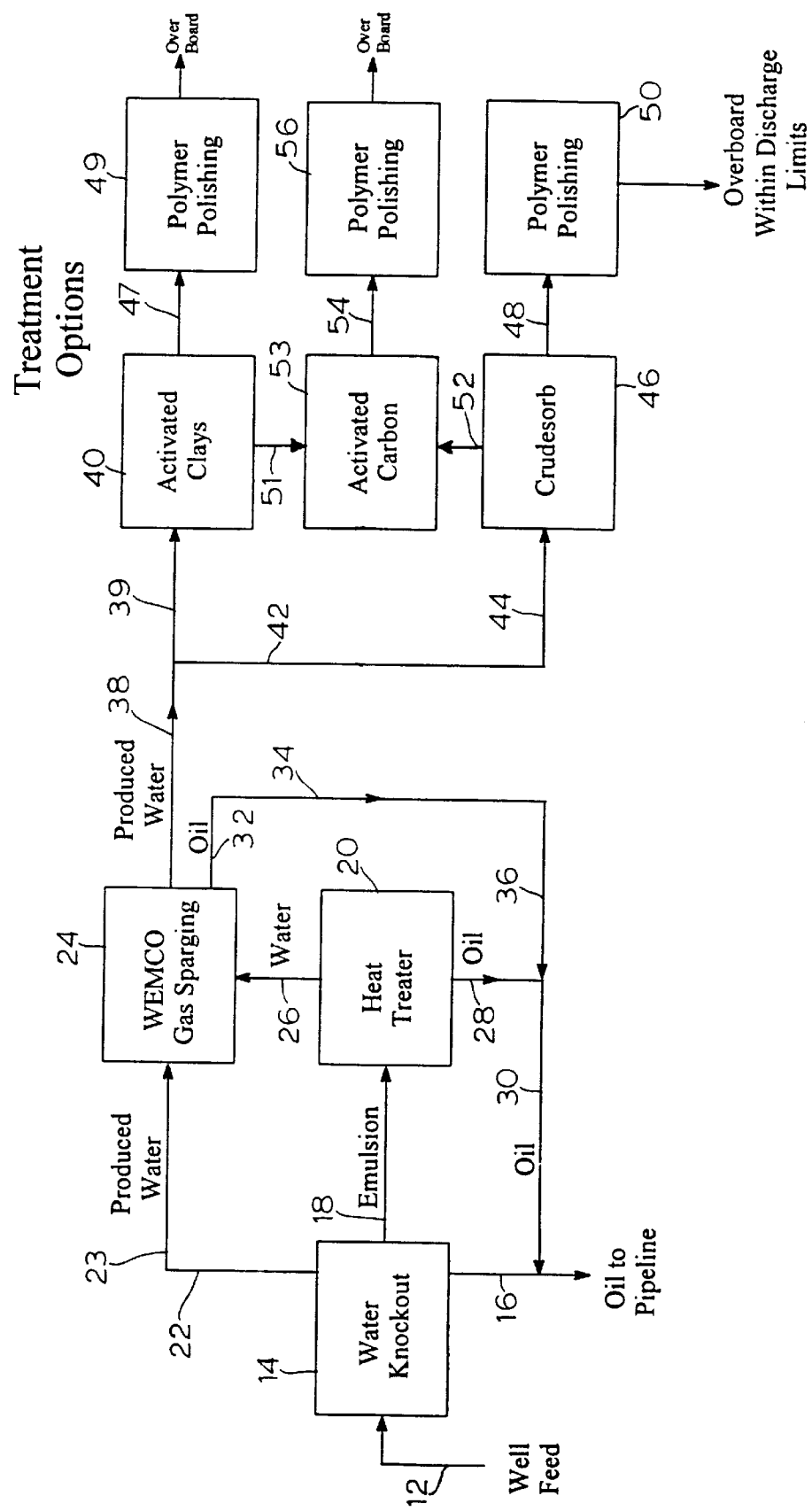

PROCESS FOR TREATING WATER FOR REMOVAL OF OIL AND WATER-SOLUBLE PETROLEUM OIL COMPONENTS

FIELD OF THE INVENTION

The present invention is directed to a process for treating water containing both water-insoluble petroleum oil components, such as oil and grease, and marginally water-soluble petroleum oil components, such as $C_6+$ carboxylic acids, phenolics, naphthenic carboxylic acid compounds, and aromatic carboxylic acid compounds in order to reduce the amount of marginally water-soluble petroleum oil components, e.g., to a level low enough for return to the ocean, presently to a level of 29 parts per million or lower in order to satisfy EPA regulations. More particularly, the present invention is directed to a process for treating produced water for removal of a majority of the water-insoluble petroleum oil components using an oil-adsorbent, such as an organophilic clay or an acid-activated smectite clay, such as acid-activated calcium bentonite clay, to provide a reduced-oil produced water in a first or pretreatment step; and then treating the reduced-oil produced water with a macroreticular adsorbent resin, such as styrene cross-linked with divinylbenzene, or a polyvinyl pyridine resin to remove marginally water-soluble petroleum oil components, such as $C_6+$ carboxylic acids, phenolics, naphthenic carboxylic acid compounds, and aromatic carboxylic acids, such as benzene carboxylic acids.

BACKGROUND OF THE INVENTION AND PRIOR ART

The recovery of petroleum oil from subterranean formations, whether on land or in the ocean, produces a substantial amount of water which is mixed with the desired petroleum oil components. This oil-associated water, called "produced water", includes water-insoluble petroleum oil components, such as petroleum oil and grease, generally in amounts less than about 100 parts per million, typically less than about 50 parts per million. The produced water also contains a number of water-soluble petroleum oil components, some of which are more water-soluble than others. The very water-soluble petroleum oil components are not presently regulated by EPA regulations and may be returned to the ocean from an off-shore petroleum oil production facility. Produced water also contains marginally water-soluble petroleum oil components, generally in amounts of about 100 to about 2,000 parts per million, that are the subject of EPA regulations because of their marginal water-solubility.

The very soluble petroleum oil components may be returned to the ocean from an off-shore petroleum oil production facility, since they do not cause any perceivable ocean contamination. The marginally water-soluble petroleum oil components, however, may not be returned to the ocean from an off-shore petroleum oil production facility because these materials have a tendency to separate from ocean water, due to the relatively low ocean water temperature, and agglomerate in the form of suspended droplets that result in a sheen on the surface of the ocean. Presently, these marginally water-soluble petroleum oil components cannot be returned to the ocean in a concentration greater than 29 parts per million.

It is well known that water-soluble organic materials can be removed from liquid and gas streams by contacting these streams with an adsorbent resin, such as an ion-exchange resin, in batch or continuous processes. Such ion-exchange resins have been used for the purpose of removing the marginally water-soluble petroleum oil contaminants from produced water, i.e., the macroreticular ion-exchange resins disclosed in U.S. Pat. Nos. 5,104,545 and 5,135,656, hereby incorporated by reference. As set forth in more detail in these two patents, various techniques have been developed for removal of oil and water-soluble organics from produced water, and these known processes suffer from the disadvantages of requiring the addition of chlorinated hydrocarbon solvents and/or strong acids and/or mixing the produced water with crude oil in order to separate the water-soluble organics from the produced water.

The use of the macroreticular bead ion-exchange resins disclosed in the '545 and '656 patents has the advantage of not requiring chemical addition to the produced water for the purpose of adjusting the pH of the produced water in order to remove the water-soluble organic contaminants. However, commercially, the macroreticular bead ion-exchange resins have not been feasible due to the produced water containing a substantial quantity, i.e., 10–100 parts per million, of water-insoluble oil. Oil or grease conveyed into a bed of ion-exchange resin beads quickly fowls the resin beads such that a maximum of only about 10–20 bed volumes of the oil-contaminated water can be passed through the beads before it is necessary to regenerate the resin beads.

Such macroreticular resin beads, such as a terpolymer of styrene-divinylbenzene-ethyl-vinylbenzene, also have been used to remove water-immiscible oil components from water, as disclosed in Canadian Patent No. 1,103,170. However, in order to remove the oil, it is necessary to add an emulsifying agent to the oil-contaminated water, and also necessary to add a strong acid to acidify the surfactant and lower the pH to about 2–6, usually to about 3 to provide oil/water phase separation. Further, frequent regeneration of the resin beads is necessary, generally after about every two bed volumes of oil-contaminated water is passed through the macroreticular resin bead bed.

SUMMARY OF THE INVENTION

In brief, the present invention is directed to a process for treating produced water containing water-insoluble petroleum oil and water-soluble components for removal of a majority of the water-insoluble petroleum oil and water-soluble petroleum oil components.

The process for removing the water-insoluble petroleum oil components includes the step of contacting a stream of the produced water with a clay oil-adsorbent capable of adsorbing a majority of the water-immiscible petroleum oil components from the produced water stream, preferably at least about 90% by weight, to provide a reduced-oil produced water. Suitable materials for adsorbing a majority of the water-insoluble petroleum oil components, such as oil and/or grease include an acid-activated smectite clay, i.e., the acid-activated calcium montmorillonite clay disclosed in U.S. Pat. No. 4,717,699, hereby incorporated by reference; and/or, preferably, an organophilic clay, such as those disclosed in this Assignee's U.S. Pat. No. 5,567,318, hereby incorporated by reference.

The reduced-oil produced water then is contacted with cross-linked beads of a macroreticular adsorbent resin, such as a polystyrene resin cross-linked with divinylbenzene, as disclosed in U.S. Pat. Nos. 5,104,545 and 5,135,676, hereby incorporated by reference; a cross-linked polyvinylidine adsorbent resin, such as disclosed in U.S. Pat. No. 4,297,220, hereby incorporated by reference; or, preferably, a cross-linked pyridine adsorbent resin, such as those sold by the Reilly Corporation, e.g., Reillex HP. The macroreticular adsorbent resin adsorbs sufficient water-soluble organic petroleum oil components from the reduced-oil produced water such that the effluent can be returned to the ocean while satisfying EPA regulations.

Accordingly, one aspect of the present invention is to provide a process for treating water contaminated with water-immiscible petroleum oil and water-soluble petroleum oil components to remove a majority of the water-immiscible petroleum oil by contact with a clay adsorbent to provide a reduced-oil water, and then treating the reduced-oil water with cross-linked beads of a macroreticular adsorbent resin for removal of a majority of the water-soluble petroleum oil components.

Another aspect of the present invention is to provide a process for treating produced water by contacting the produced water with a clay adsorbent, such as an acid-activated smectite clay or an organophilic clay to form a reduced-oil produced water having at least 90% by weight of a water-immiscible petroleum oil contaminants removed from the produced water, before treating the reduced-oil produced water with an adsorbent resin capable of adsorbing a majority of the water-soluble petroleum oil components from the reduced-oil produced water.

Still another aspect of the present invention is to provide a process for removing water-immiscible petroleum oil components from produced water, to form a reduced-oil produced water, by contact with an oil-adsorbent clay, and then treating the reduced-oil produced water with a bed of beads of a cross-linked polyvinyl pyridine polymer for surprisingly effective removal of water-soluble petroleum oil components from the produced water.

The above and other aspects and advantages of the present invention will become more apparent from the following detailed description of the preferred embodiments, taken in conjunction with the drawing.

BRIEF DESCRIPTION OF THE DRAWING

The FIGURE is a flow diagram for treating produced water for removal of both water-insoluble petroleum oil components and water-soluble petroleum oil components, including commonly used treatment steps to form the produced water.

DETAILED DESCRIPTION OF THE PREFERRED EMBODIMENTS

The present invention, shown schematically in the drawing, is a process for removing water-insoluble petroleum oil components, such as oil and grease, from produced water to provide a reduced-oil produced water, and then contacting the reduced-oil produced water with cross-linked beads of a macroreticular adsorbent resin for removal of water-soluble petroleum oil components. While others have found ways to remove the water-soluble petroleum oil components, prior art techniques have required the addition of other contaminants to the produced water or have failed because the water-insoluble petroleum oil components, particularly the remaining oil and grease in the produced water, have quickly fowled the resin beads used for removal of the water-soluble components.

In accordance with the present invention, the produced water is first contacted with a clay oil adsorbent capable of adsorbing a majority of the water-insoluble petroleum oil components, preferably at least about 90 percent by weight, particularly oil and grease, from said produced water, and then contacting the reduced-oil produced water with an adsorbent resin for removal of water-soluble petroleum oil components. In particular, it has been found that an acid-activated smectite clay and/or an organophilic clay removes a sufficient percentage of the water-insoluble oil and grease components from the produced water such that the reduced-oil produced water then can be contacted with cross-linked beads of a macroreticular adsorbent resin such that at least about 50 bed volumes, preferably at least about 75 bed volumes, more preferably at least about 100 bed volumes, up to about 1,000 bed volumes of the reduced-oil produced water can be conveyed through a bed of the cross-linked macroreticular adsorbent resin beads before it is necessary to regenerate or replace the resin beads. This is most unexpected in this art since prior art processes using macroreticular resin beads required resin bead regeneration after, at most, about 10 bed volumes of produced water through a bed of macroreticular resin beads.

The petroleum oil components generally designated as "water-soluble" that are regulated by the EPA are metal salts of oxygenated hydrocarbons; $C_6+$ alkane acids; cyclic acids, including naphthenates; carboxylates; phenols; aromatic acids; and the like.

The produced water treatment process shown in the drawing is directed specifically to produced water resulting from the recovery of oil from a subterranean formation beneath the ocean. However, it should be understood that the process of the present invention is useful for removal of oil and water-soluble organic compounds associated with oil contained in any water produced by any industrial process that generates an aqueous waste water stream containing oil and/or grease and water-soluble organic contaminants, e.g., an oil refining process.

Turning now to the drawing, it should be understood that the left-hand portion of the drawing generally describes process steps used to separate petroleum oil, recovered from a subterranean oil well, from water contained therewith and describes typically used process steps, through reference numeral 38 resulting in "produced water". The process of the present invention, for treating said produced water, is shown in the right-hand portion of the drawing, beginning with reference numeral 39.

As shown in the drawing, a well feed containing petroleum oil, including oil and grease as well as other water-insoluble petroleum oil components and very water-soluble petroleum oil components and marginally water-soluble petroleum oil components in water is conveyed through conduit 12 to a water knockout vessel 14. The water knockout vessel 14 separates the water and water-soluble petroleum oil components from the oil and grease components by phase separation. The oil is conveyed through conduit 16 to an oil pipeline, and an emulsified portion of water and oil is sent along conduit 18 to a heat treater 20 where the oil/water emulsion is broken to separate the oil from the water. A water-immiscible oil portion of the well feed from the water knockout vessel 14 is conveyed along conduits 22 and 23 to a gas sparging vessel 24 where a volatile gas is bubbled through the produced water for vaporization and removal of dissolved gases and to evaporate the more volatile or lower boiling components from the petroleum oil materials contained in the produced water within the gas sparging vessel 24.

As shown in the drawing, the water portion of the oil/water emulsion broken in heat treater 20 also is conveyed into the gas sparging unit 24 for removal of dissolved gases and lower boiling components that are solubilized within the water from the heat treater 20. The oil portion of the emulsion, broken in heat treater 20, is conveyed along conduits 28 and 30 to an oil pipeline. Similarly, the oil component from the gas sparging unit 24 is separated from the water in the gas sparging unit 24 and is conveyed along conduits 32, 34 and 36 to the oil pipeline. The remaining water from the gas sparging unit 24 is conveyed along conduits 38 and 39 into the treatment apparatus of the present invention for removal of water-insoluble petroleum oil components, thereby providing a reduced-oil produced water and then to a bed of macroreticular adsorbent resin beads for removal of the water-soluble petroleum oil components, described in more detail hereinafter.

The produced water being conveyed along conduit 38 typically contains less than about 100 parts per million, more typically less than about 50 parts per million oil and grease components; some very soluble organic compounds such as acidic acid; propionic acid, propanol, butanol, and the like, which are not EPA regulated because they remain solubilized when returned to the ocean; and marginally water-soluble petroleum oil components, generally in amounts of about 100 to about 2,000 parts per million that tend to separate from ocean water in the form of tiny droplets that agglomerate and appear on the ocean surface and, therefore, are of substantial concern to the EPA and cannot be returned to the ocean in a concentration more than 29 parts per million.

In accordance with an important feature of the present invention, this produced water is conveyed along conduits 38 and 39 for contact with an acid-activated clay in oil-removal vessel 40 or the produced water is conveyed along conduits 42 and 44 to oil-removal vessel 46 for contact with an organophilic clay. In either vessel 40 or 46 a majority of the water-insoluble petroleum oil and grease components are removed from the produced water in a single pass through the bed of clay adsorbent. This removal step is accomplished without the addition of acid, emulsifying agents or chlorinated hydrocarbons to the produced water, and mixing with additional oil is not required for oil separation. The apparatus and process of the present invention, therefor, are surprisingly effective without further contaminating the produced water with components regulated by the EPA.

The acid-activated clay in oil removal vessel 40, is, for example, an acid-activated calcium montmorillonite clay. It is well known that many naturally occurring clays may be acid-treated to enhance their ability to decolorize or bleach oils, by removing oil-soluble colorant compounds therefrom, such as mineral oils, vegetable oils, various fractions from petroleum, especially lubricating oils, and purification of melted animal fats and beeswax, as disclosed in this Assignee's U.S. Pat. Nos. 4,717,699 and 5,330,946, hereby incorporated by reference. The base clay that is acid-activated for use in oil-adsorbent vessel 40 may be any of the smectites, including swelling clays such as sodium montmorillonite or sodium bentonite, or non-swelling smectites such as calcium or magnesium montmorillonite. Other suitable base clays that can be acid-activated for use in adsorbing petroleum oil and grease in vessel 40 include nontronite, saponite, illite, hydrous mica types of clay, halloysite, and slaking-type bentonites.

In general, the process of acid-activation includes the steps of grinding the clay for more uniform and faster reaction with an aqueous solution of acid, preferably a strong acid such as a mineral acid, e.g., hydrochloric, nitric, or sulfuric acid. Generally, the clay is ground to a particle size distribution such that at least about 90% by weight of the clay particles are sized in the range of about 5 $\mu$m to about 400 $\mu$m and the particles are slurried in water having a concentration of strong acid of about 10% to about 50% by weight, usually about 12% to about 35% by weight acid, based on the total weight of water plus acid. Dissolution of acid in the slurry water brings the initial temperature of the acid solution and slurried clay up to a temperature in the range of about 25° C. to about 75° C. Thereafter, it is common to heat the acid solution and clay to a temperature of about 80° C. to about 100° C. for faster reaction of the acid with the clay such that complete acid-activation is accomplished within an acid digestion time of about 6 to about 8 hours. During acid digestion, the acid diffuses into the clay interstices and reacts with the metal ions on the clay interlayer platelet surfaces. Acid-activation is complete when at least about 70% to about 80% of the acid has reacted, as can be determined easily by monitoring the free acid in the digestion slurry to determine the extent of reaction with the clay.

When acid-activation is completed, the acid-activated clay is separated from a majority of the acid solution and washed. Separation and washing both can be accomplished in a filter press wherein the filter press is washed with pressurized (e.g., 20–150 psi) wash water until the filtrate water is relatively clean, e.g., having a pH of about 2.5 to about 4.0. After drying, e.g., to about 10% to about 20% by weight water, the resulting acid-activated clay is relatively porous, non-compacting and can be loaded into vessel 40 as an oil-adsorbent material for removal (adsorption) of oil and grease from the produced water.

Oil removal vessel 46 contains an organophilic clay or organoclay, used herein interchangeably to refer to various types of clay, e.g., smectites, that have organoammonium ions substituted for cations on the platelet surfaces between the clay layers. The term "organoammonium ion substituted" refers to a substituted ammonium ion in which one or more hydrogen atoms are replaced by an organic group. The organoclays are essentially solid compounds that have an inorganic and an organic phase.

The preferred clay substrates for use in vessel 46 are the smectite-type clays, particularly the smectite-type clays that have a cation exchange capacity of at least about 75 milliequivalents per 100 grams of clay. Useful clays for such purpose include the naturally occurring Wyoming variety of swelling sodium bentonite and similar clays, and hectorite, which is a magnesium-lithium silicate clay. The clays are preferably converted to the sodium form if they are not already in this form. This can be effected by a cation exchange reaction with a soluble sodium compound. These methods are well-known in the art. Smectite-type clays prepared synthetically can also be utilized, such as montmorillonite, bentonite, beidelite, hectorite, saponite, and stevensite.

The organoclays useful in this invention also include those set forth in U.S. Pat. No. 2,531,427 to Hauser, hereby incorporated by reference. These organoclays are modified clays which exhibit, in organic liquid, some of those characteristics that untreated clays exhibit in water. For example, they will swell in many organic liquids and will form stable gels and colloidal dispersions.

Generally, the quaternary ammonium salt substituted onto the clay has organic groups attached to the clay that will range from aliphatic hydrocarbons of from 1 to 24 carbons to aromatic organic molecules, such as benzyl groups, that could have a host of groups substituted on the benzyl ring. The number of benzyl versus straight chain hydrocarbons substituted on the ammonium ion can vary from 3 to 0 (i.e., dimethyl dioctadodecyl 0:2, methyl benzyl dioctadodecyl 1:2, dibenzyl dioctabenzyl 1:1, tribenzyl octadecyl 3:1, and methyl dibenzyl octadecyl 2:1). The amount of alkyl ammonium salt substituted on the clay can vary between 0.5% to 50% by weight.

One organoclay useful in vessel 46 comprises one or more of the following types of quaternary ammonium cation modified montmorillonite clays:

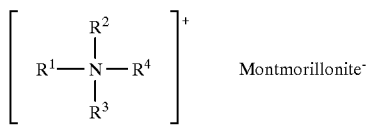

wherein $R^1$ is an alkyl group having at least 10 carbon atoms and up to, for example, 24 atoms, and preferably having a chain length of from 12 to 18 carbon atoms; $R^2$ is hydrogen, benzyl, or an alkyl group of at least 10 carbon atoms and up to, for example 24 carbon atoms, and preferably from 12 to 18 carbon atoms; and $R^3$ and $R^4$ are each hydrogen or lower alkyl groups, i.e., they contain carbon chains of from 1 to 4 atoms, and preferably are methyl groups.

Other organoclays utilizable in vessel 46 include benzyl organoclays such as dimethyl benzyl (hydrogenated tallow) ammonium bentonite; methyl benzyl di(hydrogenated tallow) ammonium bentonite; and more generally quaternary ammonium cation modified montmorillonite clays represented by the formula:

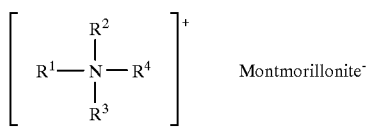

wherein $R^1$ is $CH_3$ or $C_6H_5CH_2$; $R^2$ is $C_6H_5CH_2$; and $R^3$ and $R^4$ are alkyl groups containing long chain alkyl radicals having 14 to 22 carbon atoms, and most preferably wherein 20% to 35% of said long chain alkyl radicals contain 16 carbon atoms and 60% to 75% of said long chain alkyl radicals contain 18 carbon atoms.

The montmorillonite clays that may be so modified are the principal constituents of bentonite rock, and have the chemical compositions and characteristics described, for example, in Berry & Mason, "Mineralogy," 1959, pp. 508–509. Modified montmorillonite clays of this type (i.e., organoclays) are commercially available from Southern Clay Products, Inc., Gonzales, Tex. under such trade designations as CLAY-TONE 34 and 40, and are available from NL Industries, Inc., New York, N.Y. under such trade designations as BEN-TONE 27, 34, and 38. Other organoclays useful in the invention are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methyl bis (2-hydroxyethyl) octadecyl ammonium bentonite.

As is well-known in the art, organoclay sorbents are advantageously utilized in admixture with a diluent having a similar density, such as disclosed in this Assignee's U.S. Pat. No. 5,567,318. A widely used and preferred diluent is anthracite coal. The diluent has the function of separating clay granules from each other in order to maximize the swelling capability thereof, thus maximizing the sorption capacity of the clay.

Typically, a homogenous mixture of clay and anthracite coal or other diluent comprises 30 to 60 weight percent clay, and corresponding with 70 to 40 weight percent diluent. Preferably, the mixture contains about 30 to about 40 weight percent clay and correspondingly about 70 to about 60 weight percent coal. A typical mixture may contain about 35 weight percent clay and about 65 weight percent coal.

After treatment by the clay oil-adsorbent in vessel 40 and/or 46, the reduced-oil produced water either is conveyed directly through conduit 47 or 48 into a polymer polishing vessel 49 or 50, or can be directed through conduit 51 or 52 into an activated carbon bed in vessel 53 for absorption of water-soluble organics prior to being conveyed through conduit 54 into polymer polishing vessel 56. The polymer polishing vessels 49, 50 and 56 contain a bed of cross-linked macroreticular resin beads, preferably polyvinyl pyridine resin beads. The reduced-oil produced water being conveyed along conduits 47, 48 or 54 contain less than about 20 parts per million, preferably less than about 10 parts per million, water-immiscible petroleum oil and grease, and, therefore, can be continuously flowed through the polymer polishing vessels 49, 50 and 56, respectively, in an amount of at least about 50 bed volumes, preferably at least about 75–100 bed volumes, before it is necessary to regenerate or replace the macroreticular resin beads contained within vessels 49, 50 and 56.

A number of different cross-linked macroreticular adsorbent resin beads can be included within the polymer polishing vessels 49, 50 and 56 such as polystyrene cross-linked with divinylbenzene; cross-linked polyvinylidine resin beads; or polyvinyl pyridine resin beads. Examples of the polyvinyl pyridine resin beads are disclosed in U.S. Pat. Nos. 4,359,593 and 4,640,831, hereby incorporated by reference.

The preferred cross-linked macroreticular beads are formed from a polyvinyl pyridine polymer containing units corresponding to one of the formulas

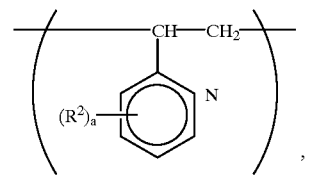

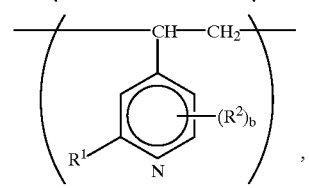

or

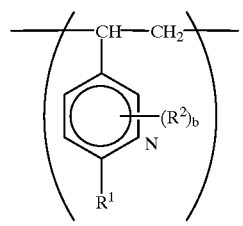

wherein $R^1$ is separately in each occurrence $C_{2-20}$ alkyl, $C_{6-20}$ aryl, $C_{7-20}$ alkaryl, $C_{7-20}$ aralkyl or $C_{3-20}$ cycloalkyl, wherein the $C_{2-20}$ alkyl, $C_{6-20}$ aryl, $C_{7-20}$ aralkyl, $C_{7-20}$ alkaryl or $C_{3-20}$ cycloalkyl is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy; $R^2$ is separately in each occurrence $C_{1-20}$ alkyl, $C_{6-20}$ aryl, $C_{7-20}$ alkaryl, $C_{7-20}$ aralkyl, $C_{3-20}$ cycloalkyl, nitro, cyano, halo, $C_{1-20}$ alkoxy, $C_{6-20}$ aryloxy, $C_{7-20}$ alkaryloxy or $C_{7-20}$ aralkoxy wherein the $C_{1-20}$ alkyl, $C_{6-20}$ aryl, $C_{7-20}$ alkaryl, $C_{7-20}$ aralkyl, $C_{1-20}$ alkoxy, $C_{6-20}$ aryloxy, $C_{7-20}$ alkaryloxy, $C_{7-20}$ aralkoxy or $C_{3-20}$ cycloalkyl group is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy;

a is separately in each occurrence an integer of from 0 to 4; and b is separately in each occurrence an integer of from 0 to 3.

Examples of preferred polymers include 2,4,6-tri-t-butylpyridine, 2,6-di-t-butyl-4-methylpyridine, 2,6-di-t-butylpyridine, 2-t-butylpyridine, 2-benzylpyridine, 2,6-diphenylpyridine, 2-phenylpyridine, 2,6-dimethoxypyridine, 2-phenoxypyridine, 2,6-diphenoxypyridine, 2-methylquinoline, 6-methylquinoline, 7,8-benzoquineline, and the like. More preferred reversible bases include 2,4,6-tri-6-butylpyridine, 2,6-di-t-butyl-4-methylpyridine, 2,6-di-ti-butylpyridine, 2-t-butylpyridine, 2-benzylpyridine, 2,6-diphenylpyridine, 2-phenylpyridine, 2-phenoxypyridine, 2,6-diphenoxypyridine and 2,6-dimethoxypyridine. These polyvinyl pyridine polymers are well known, and are disclosed in DeVries U.S. Pat. No. 4,640,831, hereby incorporated by reference.

The useful polyvinyl pyridine resins include homopolymers of vinyl pyridine compounds, which are appropriately sterically hindered, and copolymers of vinyl pyridine compounds with 1,2-ethylenically unsaturated compounds, for example, styrene, divinylbenzene, ethylene, vinyl chloride, and the like. Furthermore, the vinyl pyridines may be polymerized with 2 or more of such 1,2-ethylenically unsaturated compounds. Such polymerization processes are well-known in the art, see for example, D'Aelio, U.S. Pat. No. 2,623,013; *Kirk-Othmer Encyclopedia of Chemical Technology*, 3rd Ed., Vol. 21, p. 816 et seq. and Vol. 19, pp. 475–76; references hereby incorporated by reference.

In the hereinbefore presented formulas $R^1$ is preferably $C_{3-10}$ alkyl, $C_{6-10}$ aryl, $C_{7-10}$ alkaryl, $C_{7-10}$ aralkyl, $C_{5-10}$ cycloalkyl, $C_{6-10}$ aryloxy and $C_{7-10}$ alkaryloxy. More preferably $R^1$ is $C_{3-10}$ alkyl, $C_{7-10}$ alkaryloxy, $C_{6-10}$ aryloxy or $C_{6-10}$ aryl; $R^1$ is most preferably isopropyl, isobutyl, t-butyl, phenoxy, or phenyl. $R^2$ is preferably halo or $C_{1-10}$ alkyl. $R^2$ is more preferably $C_{1-3}$ alkyl. Preferably, a is an integer of from 0 to 2, and most preferably 0 or 1. Preferably, b is an integer of 0 or 1.

These polyvinyl pyridine beads are useful for recovering any compound that has an acidic proton which is capable of forming a salt, such as the protic acids that are prevalent in produced water.

The produced water containing the water-soluble protic acidic petroleum oil compounds can be contacted at any temperature at which the salt of the acid and the reversible base is formed. Preferably temperatures for such contacting are between about −50° C. and 150° C. More preferably temperatures for such contacting are between about 0° C. and 100° C.

In accordance with important advantages of the process of the present invention, the process can be carried out resulting in a effluent that can be returned to the ocean without the steps of ultrafiltration, without using hydrocyclone separating apparatus, without adding quaternary or low molecular weight amines to the produced water; without the addition of strong organic acids for pretreatment of the produced water and without mixing the produced water with free oil after acid treatment. Further, the process of the present invention does not require produced water deionization, water softening or filtration. Further, regenerating wash solvents for regenerating the resin beads may be blended back into the oil stream so that stream distillation for removal of regenerating solvent is not necessary. The preferred polyvinyl pyridine resins can be regenerated using caustic that can be removed by the acid-activated or organophilic clays in oil removal vessels 40 or 46, respectively, or the caustic can be captured and disposed of separately.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A process for treating water containing water-insoluble petroleum oil components selected from the group consisting of oil and grease, and water-soluble petroleum oil components for removal of a majority of said water-insoluble petroleum oil and water-soluble petroleum oil components, comprising:

contacting a stream of said water with a clay oil-adsorbent to adsorb a majority of the water-insoluble petroleum oil components from said water stream to provide a reduced-oil water; and contacting the reduced-oil water with cross-linked beads of a polyvinyl pyridine macroreticular adsorbent resin for removal of a majority of said water-soluble petroleum oil components.

2. The process of claim 1, wherein the water contains about 50 ppm to about 150 ppm of said water-soluble petroleum oil components prior to contact with said beads of adsorbent resin.

3. The process of claim 1, wherein after contacting the reduced-oil water with said beads of adsorbent resin, the water contains 29 ppm or less or said water-soluble petroleum oil components.

4. The process of claim 1, wherein the resin comprises poly-4-vinylpyridine.

5. The process of claim 1, wherein the clay oil-adsorbent comprises an acid-activated clay.

6. The process of claim 5, wherein the acid-activated clay comprises an acid-activated smectite clay.

7. The process of claim 6, wherein the acid-activated smectite clay is selected from the group consisting of calcium montmorillonite; calcium bentonite; magnesium montmorillonite; magnesium bentonite; sodium montmorillonite; sodium bentonite; illite; saponite; a hydrous mica clay; nontronite; and halloysite; slaking bentonites, and mixtures thereof.

8. The process of claim 1, wherein the clay oil-adsorbent comprises an organophilic clay.

9. The process of claim 8, further including an anthracite coal mixed together with the organophilic clay.

10. The process of claim 9, wherein the clay and anthracite coal are mixed in a ratio of about 30% to about 60% by weight organophilic clay, and about 70% to about 40% by weight anthracite coal.

11. The process of claim 8, wherein the organophilic clay is selected from the group consisting of formula (I), formula (II), and mixtures thereof:

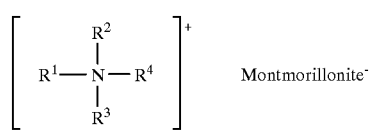 (I)

wherein $R^1$ is an alkyl group having at least 10 carbon atoms; $R^2$ is hydrogen, benzyl, or an alkyl group of at least 10 carbon atoms; and $R^3$ and $R^4$ are each hydrogen or lower alkyl groups containing from 1 to 4 atoms;

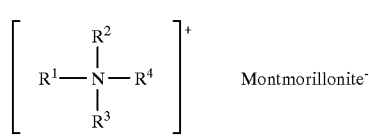 (II)

wherein $R^1$ is $CH_3$ or $C_6H_5CH_2$; $R^2$ is $C_6H_5CH_2$; and $R^3$ and $R^4$ are alkyl groups containing long chain alkyl radicals having 14 to 22 carbon atoms.

12. The process of claim 11, wherein 20% to 35% of said $R^3$ and $R^4$ radicals contain 16 carbon atoms and 60% to 75% of said $R^3$ and $R^4$ radicals contain 18 carbon atoms.

13. The process of claim 8, wherein the macroreticular resin is a polymer containing units corresponding to one of the formulas

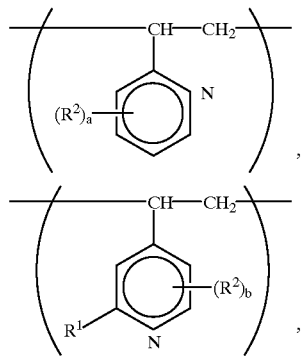

or

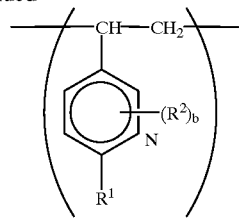

wherein
$R^1$ is separately in each occurrence $C_{2-20}$ alkyl, $C_{6-20}$ aryl, $C_{7-20}$ alkaryl, $C_{7-20}$ aralkyl or $C_{3-20}$ cycloalkyl, wherein the $C_{2-20}$ alkyl, $C_{6-20}$ aryl, $C_{7-20}$ aralkyl, $C_{7-20}$ alkaryl or $C_{3-20}$ cycloalkyl is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy;

$R^2$ is separately in each occurrence $C_{1-20}$ alkyl, $C_{6-20}$ aryl, $C_{7-20}$ alkaryl, $C_{7-20}$ aralkyl, $C_{3-20}$ cycloalkyl, nitro, cyano, halo, $C_{1-20}$ alkoxy, $C_{6-20}$ aryloxy, $C_{7-20}$ alkaryloxy or $C_{7-20}$ aralkoxy wherein the $C_{1-20}$ alkyl, $C_{6-20}$ aryl, $C_{7-20}$ alkaryl, $C_{7-20}$ aralkyl, $C_{1-20}$ alkoxy, $C_{6-20}$ aryloxy, $C_{7-20}$ alkaryloxy, $C_{7-20}$ aralkoxy or $C_{3-20}$ cycloalkyl group is unsubstituted or substituted with a halo, nitro, cyano, $C_{1-20}$ alkoxy, $C_{6-20}$ aryloxy, $C_{7-20}$ alkaryloxy or $C_{7-20}$ aralkoxy;

a is separately in each occurrence an integer of from 0 to 4; and b is separately in each occurrence an integer of from 0 to 3.

14. The process of claim 13, wherein
$R^1$ is $C_{3-10}$ alkyl, $C_{6-10}$ aryl, $C_{7-10}$ alkaryl, $C_{7-10}$ aralkyl, $C_{3-10}$ cycloalkyl, $C_{6-10}$ aryloxy and $C_{7-10}$ alkaryloxy;
$R^2$ is halo or $C_{1-10}$ alkyl;
a is an integer of from 0 to 2; and
b is an integer of 0 or 1.

15. The process of claim 14, wherein
$R^1$ is $C_{3-10}$ alkyl, $C_{6-10}$ aryl, $C_{7-10}$ alkaryloxy or $C_{6-10}$ aryloxy;
$R^2$ is $C_{1-3}$ alkyl;
a is an integer of 0 or 1.

16. The process of claim 13, wherein the polymer contains polymer units selected from the group consisting of 2,4,6-tri-t-butylpyridine, 2,6-di-t-butyl-4-methylpyridine, 2,6-di-t-butylpyridine, 2-t-butylpyridine, 2-benzylpyridine, 2,6-diphenylpyridine, 2-phenylpyridine, 2,6-dimethoxypyridine, 2-phenoxypyridine, 2,6-diphenoxypyridine, 2-methylquinoline, 6-methylquinoline, and 7,8-benzoquinoline.

17. The process of claim 16, wherein the polymer is poly-4-vinyl pyridine.

* * * * *